United States Patent
Juels et al.

(10) Patent No.: US 9,270,655 B1
(45) Date of Patent: Feb. 23, 2016

(54) CONFIGURABLE ONE-TIME AUTHENTICATION TOKENS WITH IMPROVED RESILIENCE TO ATTACKS

(71) Applicant: EMC Corporation, Hopkinton, MA (US)

(72) Inventors: Ari Juels, Brookline, MA (US); Nikolaos Triandopoulos, Arlington, MA (US); Marten van Dijk, Somerville, MA (US); John Brainard, Sudbury, MA (US); Ronald Rivest, Arlington, MA (US); Kevin Bowers, Melrose, MA (US)

(73) Assignee: EMC Corporation, Hopkinton, MA (US)

( * ) Notice: Subject to any disclaimer, the term of this patent is extended or adjusted under 35 U.S.C. 154(b) by 82 days.

(21) Appl. No.: 13/837,259

(22) Filed: Mar. 15, 2013

(51) Int. Cl.
*H04L 29/06* (2006.01)

(52) U.S. Cl.
CPC ...................... *H04L 63/08* (2013.01)

(58) Field of Classification Search
CPC ..... G06F 21/34; H04L 63/08; H04L 63/0838; H04L 63/0846
USPC .......................................................... 726/9
See application file for complete search history.

(56) References Cited

U.S. PATENT DOCUMENTS

| | | | | |
|---|---|---|---|---|
| 2003/0086565 | A1* | 5/2003 | Desai et al. | 380/45 |
| 2003/0229788 | A1* | 12/2003 | Jakobsson et al. | 713/171 |
| 2004/0030932 | A1* | 2/2004 | Juels et al. | 713/202 |
| 2004/0172535 | A1* | 9/2004 | Jakobsson et al. | 713/168 |
| 2009/0323972 | A1* | 12/2009 | Kohno et al. | 380/284 |
| 2011/0060913 | A1* | 3/2011 | Hird et al. | 713/184 |

OTHER PUBLICATIONS

Bellare, Mihir, and Sara K. Miner. "A forward-secure digital signature scheme." Advances in Cryptology-CRYPT0'99. Springer Berlin Heidelberg, 1999.*
Awasthi, Amit K., and Sunder Lal. "A remote user authentication scheme using smart cards with forward secrecy." Consumer Electronics, IEEE Transactions on 49.4 (2003): 1246-1248.*
Abdalla, Michel, et al. "From identification to signatures via the Fiat-Shamir transform: Minimizing assumptions for security and forward-security." Advances in Cryptology-Eurocrypt 2002. Springer Berlin Heidelberg, 2002.*

(Continued)

*Primary Examiner* — Syed Zaidi
(74) *Attorney, Agent, or Firm* — Ryan, Mason & Lewis, LLP

(57) ABSTRACT

Configurable one-time authentication tokens are provided with improved resilience to attacks. A one-time authentication token is configured by providing a plurality of token features that may be selectively incorporated into the configurable one-time authentication token, wherein the plurality of token features comprise at least two of the features; obtaining a selection of at least a plurality of the token features: and configuring the one-time authentication token based on the selected token features, wherein the configuration must always enable forward security for the one-time authentication token and at least one additional selected token feature. A configurable one-time authentication token is provided that comprises a plurality of selectable token features that may be selectively incorporated into the configurable one-time authentication token, wherein the configurable one-time authentication token is always configured with the forward security and at least one additional token feature.

37 Claims, 10 Drawing Sheets

(56) References Cited

OTHER PUBLICATIONS

D. M'Raihi, M. Bellare, F. Hoornaert, D. Naccache, O. Ranen "HOTP: An HMAC-Based One-Time Password Algorithm", RFC 4226, Dec. 2005. See 7.5., p. 11.*

D. M'Raihi, S. Machani, M. Pei, J. Rydell, "TOTP: Time-Based One-Time Password Algorithm", RFC 6238, May 2011. See Resynchronization, p. 7.*

RFC 4086 "Randomness Requirements for Security", Jun. 2005.*

* cited by examiner

FIG. 4
400

1. Select high-layer protections 310. Select $k_1 \geq 0$ features (technologies) for high-layer protection 310;
2. Select intermediate-layer protections 330. Select $k_2 \geq 0$ features (technologies) for intermediate-layer protection 330; and
3. Select low-layer protections 320. Select $k_3 \geq 0$ features (technologies) for low-layer protection 320;

where it holds that $k_1 + k_2 + k_3 > 2$

At the beginning of every time epoch $T$ and for the duration of the lifetime of the token 500, the following operations occur:

- Step 0: A carefully chosen random jitter delays or expedites the beginning of the computation of the following steps with respect to the beginning of current epoch $T$.

- Step 1: The blue FS-PRNG module 512-1 sequentially updates the state and computes blue pseudorandom key and values; if $T$ is the beginning of an epoch $\tilde{T}$, then pre-computation of such keys and values for some future epochs $T$ is also computed; old used states are immediately deleted. The red FS-PRNG module 512-2 operates similarly. If $T$ corresponds to the beginning of an epoch $\hat{T}$ the red and blue FS-PRNGs 512-1 and 512-2 exchange hashes of their partial states that lie at the higher level of the hierarchy.

- Step 2: The combined protocode for epoch $T$ is computed, incorporating any additional transactional data inputted to the token for epoch $T$.

- Step 3: The silent-alarm state is sampled to the silent-alarm bit; if $T$ corresponds to the beginning of an epoch $\overline{T}$, then the drifting-key state is updated and shifted; the drifting-key state is sampled to the drifting-key bits.

- Step 4: The auxiliary channel 550 maps the auxiliary-information bits to codeword $W_T$, by which the combined protocode is shifted to get the final OTP passcode.

FIG. 8
800

Immediately after the launching of the token application, then at the beginning of every time epoch $T$ and for the duration of the running of the token application, the following operations occur:

- Step 0a: The token's FS-PRNG, silent-alarm and drifting-key states are retrieved.

- Step 0b: A carefully chosen random jitter delays or expedites the beginning of the computation of the following steps with respect to the beginning of current epoch $T$.

- Step 1a: If the current epoch $T$ is the first epoch after the launching of the token application, then the blue and red FS-PRNG modules 512-1 and 512-2 update their states in a step of the appropriate length. If the current epoch $T$ is later in time than the epoch $T'$ that the two FS-PRNG modules 512-1 and 512-2 were lastly used, where $T'$ is encoded in the FS-PRNG states, then update the states to correspond to epoch $T''$ that is the next epoch of $T'$.

- Step 1b: The blue FS-PRNG module 512-1 sequentially updates the state and computes blue pseudorandom key and values; if $T$ is the beginning of an epoch $\tilde{T}$, then pre-computation of such keys and values for some future epochs $T$ is also computed; old used states are immediately deleted. The red FS-PRNG module 512-2 operates similarly. If $T$ corresponds to the beginning of an epoch $\hat{T}$ the red and blue FS-PRNGs exchange hashes of their partial states that lie at the higher level of the hierarchy.

- Steps 2-4: Same as in the hardware case 700.

FIG. 9A
900

Upon receipt of candidate passcode $P_r$, the operation of each server 150-blue and 150-red is as follows.

- Step 1: The blue server 150-blue maintains the complete history of silent-alarm and drifting-key states and each server 150-blue and 150-red maintains a history of FS-PRNG states related to a slack window of size $s$ around each current time epoch $T$, where $s$ is specified by the exact parameterization of the one-time authentication token. If the current epoch $T$ is earlier in time than the epoch $T'$ that was lastly used at a server, then the FS-PRNG state is updated in a step of the appropriate length.
- Step 2 For each epoch in the slack window:
- Step 2a: The blue server 150-blue computes and sends to the red server 150-red all possible codewords $W_r$, for $T$.
- Step 2b: Using commitment schemes, the two servers 150-blue and 150-red exchange their blue and red protocols, gradually for individual pieces of the protocols, e.g., by exchanging 2 digits 4 consecutive times in the case of 8-digit OTP passcodes. They compute the combined protocode $PR_r$.
- Step 2c: For each $W_r$, each server 150-blue and 150-red checks if $P_r = PR_r \oplus W_r$ by performing the following:
  * Replace each non-zero digit in $W_r$, with a '1' value to obtain the candidate binary codeword.
  * Check if the binary codeword is a valid hamming code value.

FIG. 9B
900

- Step 3: If no Step 2c validates, then each server 150-blue and 150-red outputs "reject," otherwise let $B_{r^*}^*$ be the matching binary codeword for epoch $T^*$. Then, binary codeword $B_{r^*}^*$ is decoded to a 4-bit value to get the silent-alarm bit $b_0$ and drifting-keys bits $b_1$ and $b_2$, and each server 150-blue and 150-red outputs "accept." If both servers 150-blue and 150-red output "accept" the user is (conditionally) authenticated according to some server-side policy that is in place.

- Step 4: The silent-alarm state is sampled by the blue server 150-blue to get the silent-alarm bit $b'$. If $b' \neq b_0$ then a silent-alarm exception is raised by the blue server 150-blue, and additionally the blue server 150-blue attempts to find the concrete values of $t$ and $c$ with which that the silent alarm test $\sigma'_{SA} = h^{(t)}(\sigma_{SA}, c)$ is validated, where $t$ and $c$ are treated as additional information about the current alerting state of the token.

- Step 5: The drifting key bits $b_1$ and $b_2$ are used by the blue server 150-blue to update the drifting-key state and if an inconsistency is observed, using the inconsistency checking described below, a drifting-key exception is raised by the blue server 150-blue 150-red.

CONFIGURABLE ONE-TIME AUTHENTICATION TOKENS WITH IMPROVED RESILIENCE TO ATTACKS

CROSS-REFERENCE TO RELATED APPLICATIONS

The present application is related to U.S. patent application Ser. No. 13/250,225, filed Sep. 30, 2011, entitled "Key Update With Compromise Detection," (now U.S. Pat. No. 8,699,713); U.S. patent application Ser. No. 13/334,709, filed Dec. 23, 2011, entitled "Methods and/or Apparatus for Generating Forward Secure Pseudorandom Numbers," (now U.S. Pat. No. 9,008,303); U.S. patent application Ser. No. 13/826,924, filed Mar. 14, 2013, entitled "Event-Based Data Signing via Time-Based One-Time Authentication Passcodes;" U.S. patent application Ser. No. 13/826,993, filed Mar. 14, 2013, entitled "Time Synchronization Solutions for Forward-Secure One-Time Authentication Tokens;" U.S. patent application Ser. No. 13/404,780, filed Feb. 24, 2012, entitled "Method and Apparatus for Embedding Auxiliary Information in One-Time Passcode Authentication Tokens," (now U.S. Pat. No. 8,984,609; U.S. patent application Ser. No. 13/404,788, filed Feb. 24, 2012, entitled "Methods and Apparatus for Silent Alarm Channels Using One-Time Passcode Authentication Tokens;" U.S. patent application Ser. No. 13/728,271, filed Dec. 27, 2012, entitled "Forward Secure Pseudorandom Number Generation Resilient to Forward Clock Attacks," (now U.S. Pat. No. 9,083,515); U.S. patent application Ser. No. 13/404,737, filed Feb. 24, 2012, entitled "Method and Apparatus for Authenticating a User Using Multi-Server One-Time Passcode Verification," (now U.S. Pat. No. 9,118,661); and U.S. patent application Ser. No. 13/828,588, filed Mar. 14, 2013, entitled "Randomizing State Transitions for One-Time Authentication Tokens," each incorporated by reference herein.

FIELD OF THE INVENTION

The present invention relates generally to one-time authentication tokens and, more particularly, to techniques for designing and configuring configurable one-time authentication tokens.

BACKGROUND

One-time authentication tokens are used to realize two-factor authentication according to which a traditional passcode-based user-authentication method (using a secret you know) is augmented with a one-time passcode that is produced by an authentication token (i.e., a secret produced by something you possess). The two factors collectively provide a stronger authentication method.

One-time authentication tokens typically produce a series of unpredictable one-time passcodes on a regular time basis, i.e., in specified time intervals often called epochs. Passcodes are unpredictable as they get produced in a pseudorandom manner using a secret state, often referred to as a seed, that is stored at the token and also shared with the server. Tokens can either be software or hardware based. Software tokens produce passcodes on-demand, whenever the token's application is launched in the host device, where a series of passcodes is generated for the epochs following the launching of the application. Hardware tokens typically produce passcodes on a permanent basis, one passcode per epoch, for the entire lifetime of their battery. Overall, such tokens produce a time-based series of unpredictable one-time passcodes by employing their seed to generate pseudorandom bits that are converted to passcodes.

The security of any one-time authentication token collapses if an attacker obtains access to the secret seed of the token. Using the seed, the attacker can clone the token and reconstruct the series of passcodes that the token will produce. Indeed, the attacker can use the token's seed to reproduce the pseudorandom numbers used for passcode generation, effectively breaking the unpredictability of the passcodes. In turn, the attacker can increase its chances for impersonating the corresponding user, by either performing a brute-force attack on the user's PIN or by launching a more sophisticated man-in-the-middle attack for harvesting the user's PIN.

Since the security of the token is based on a secret seed, the attacker will attempt to obtain this secret seed. There are three forms of attack that an attacker can employ to obtain access to the secret seed of the token of a target victim user. Under a server compromise attack, the attacker compromises the authentication server and obtains the secret seed of the tokens of one or more users. With a token tampering attack, the attacker compromises the token and obtains the secret seed of the token. Finally, with a seed capturing attack, the attacker obtains the secret seed of the token indirectly by attacking a storage or communication unit used to store or transfer the token's seed, or through side-channel attacks performed against the token or the server.

A need therefore exists for one-time authentication tokens that protect against the above types of attacks that attempt to obtain the secret seed of one or more tokens. A further need exists for configurable one-time authentication tokens.

SUMMARY OF THE INVENTION

The present invention in the illustrative embodiments described herein provides configurable one-time authentication tokens with improved resilience to such attacks. According to one aspect of the invention, a one-time authentication token is configured by providing a plurality of token features that may be selectively incorporated into the configurable one-time authentication token, wherein the plurality of token features comprise at least two of the features: split-server passcode verification, silent alarms, drifting keys, forward-secure pseudorandom number generation, token randomness generation, randomized state transitions, data-transaction signing, auxiliary channels and time synchronization; obtaining a selection of at least a plurality of the token features; and configuring the one-time authentication token based on the selected token features, wherein the configuration must always enable forward security for the one-time authentication token and at least one additional selected token feature.

According to a further aspect of the invention, the configuration must satisfy one or more dependency rules. For example, the dependency rules may comprise requiring (i) that each of the split-server passcode verification with proactivization feature and the silent alarms feature each require the forward-secure pseudorandom generator feature; (ii) the randomized state transitions feature requires at least one of a forward-secure pseudorandom generator feature and a randomness source feature; (iii) the drifting keys feature and the silent alarms feature require the auxiliary channel feature; and (iv) the drifting keys feature requires a randomness source feature.

In one exemplary implementation, the split-server passcode verification feature, the silent alarms feature and the drifting keys feature comprise high-layer protection that provide intrusion-detection and intrusion-resilience. The forward-secure pseudorandom number generation feature, the token randomness generation feature and the randomized state transitions feature comprise low-layer protection that provide tamper-resistance. The data-transaction signing feature, the auxiliary channels feature and the time synchronization feature comprise intermediate-layer protection that provide token-visibility.

The one-time authentication token may be configured, for example, at a time of manufacture, system initialization and/or software update time. The features may be selectively activated.

According to another aspect of the invention, a configurable one-time authentication token is provided that comprises a plurality of selectable token features that may be selectively incorporated into the configurable one-time authentication token, wherein the plurality of token features comprise at least two of the features: split-server passcode verification, silent alarms, drifting keys, forward-secure pseudorandom number generation, token randomness generation, randomized state transitions, data-transaction signing, auxiliary channels and time synchronization, wherein the configurable one-time authentication token is always configured with the forward security and at least one additional token feature.

The disclosed exemplary configurable one-time authentication tokens overcome one or more of the problems associated with the conventional techniques described previously. These and other features and advantages of the present invention will become more readily apparent from the accompanying drawings and the following detailed description.

BRIEF DESCRIPTION OF THE DRAWINGS

FIG. 4 illustrates exemplary pseudo code for designing a one-time passcode token in accordance with the framework of FIG. 3;

FIG. 7 illustrates exemplary pseudo code for token operation for an exemplary hardware implementation of a token;

FIG. 8 illustrates exemplary pseudo code for token operation for an exemplary software implementation of a token; and FIGS. 9A and 9B, collectively, illustrate exemplary pseudo code for server operation for an exemplary split server implementation.

DETAILED DESCRIPTION

Aspects of the present invention provide one-time authentication tokens with improved resilience to attacks that attempt to obtain the secret seed of one or more tokens.

Figure 1:
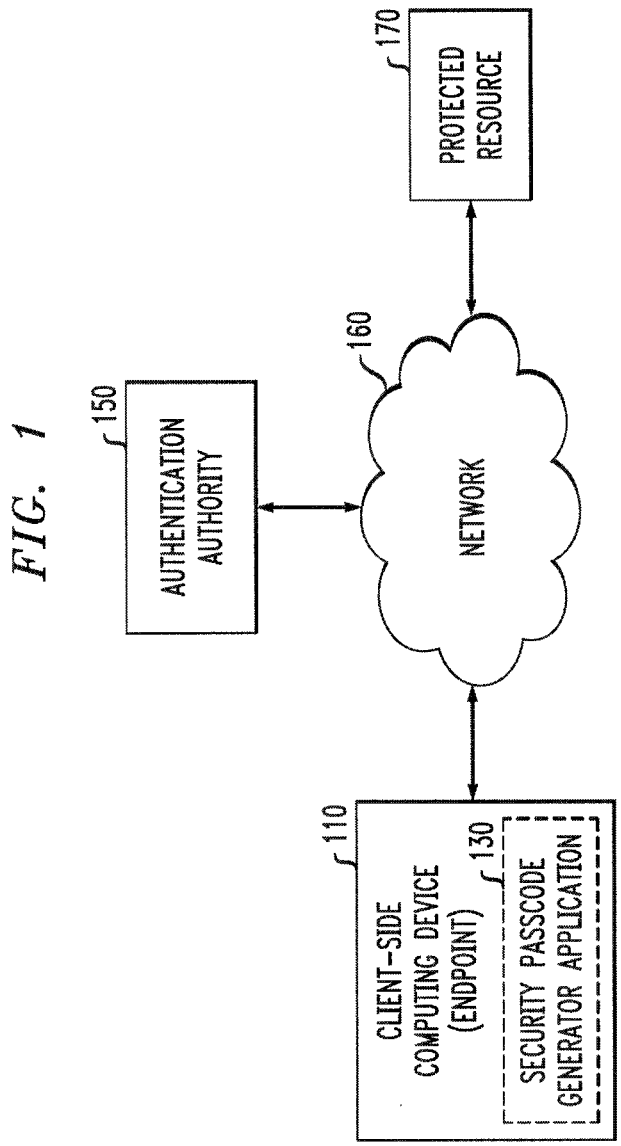
FIG. 1 illustrates an exemplary network environment in which the present invention can operate.

FIG. 1 illustrates an exemplary network environment in which aspects of the present invention can operate. As shown in FIG. 1, an exemplary client-side computing device (CSCD) 110 communicates with a protected resource 170 over a network 160. In an exemplary implementation, the user must authenticate with an authentication authority 150 using a passcode generated by a security passcode-generator application 130 (hereinafter, referred to as security passcode app 130) before obtaining access to the protected resource 170. In alternate variations, a user can employ a hardware one-time authentication token, such as the RSA SecurID® user authentication token commercially available from RSA Security Inc. of Bedford, Mass. U.S.A. The network 160, may comprise, for example, a global computer network such as the Internet, a wide area network (WAN), a local area network (LAN), a satellite network, a telephone or cable network, or various portions or combinations of these and other types of networks.

The user of the CSCD 110 is authenticated with the protected resource 170 using a one-time variable key that may be generated in accordance with the present invention. It is to be appreciated that a given embodiment of the disclosed system may include multiple instances of CSCD 110, security passcode app 130, authentication authority server 150 and protected resource 170, and possibly other system components, although only single instances of such components are shown in the simplified system diagram of FIG. 1 for clarity of illustration.

The security passcode app 130 is shown in FIG. 1 as being implemented by the CSCD 110. The security passcode app 130 may be implemented, for example, using the RSA SecurID® user authentication token commercially available from RSA Security Inc. of Bedford, Mass., U.S.A. The security passcode app 130 may be a server or other type of module that is accessible over the network 160, or it may be a software component resident on the CSCD 110. As another alternative, security passcode app 130 may be distributed over multiple devices, one of which may be the CSCD 110. Thus, while the present invention is illustrated herein using a security passcode app 130 executing on the CSCD 110, such that the CSCD 110 can read a given passcode (or another authentication value) directly from the security passcode app 130, other implementations are within the scope of the present invention, as would be apparent to a person of ordinary skill in the art. For example, for other security passcode apps 130 that are not connectable to a computer or other user device in this manner, the user may manually enter a password or another value displayed by the security passcode app 130 at the time of the attempted access. In addition, for a detailed discussion of a modular and/or component implementation of a token-based authentication technique, see, for example, U.S. Pat. No. 7,562,221 to Nyström et al., assigned to the assignee of the present invention and incorporated by reference herein.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention. The CSCD 110 may also be referred to herein as simply a "user." The term "user" should be understood to encompass, by way of example and without limitation, a user device, a person utilizing or otherwise associated with the device, or a combination of both. A password or other authentication information described as being associated with a user may, for example, be associated with a CSCD device 110, a person utilizing or otherwise associated with the device, or a combination of both the person and the device.

The authentication authority 150 is typically a third party entity that processes authentication requests on behalf of web servers and other resources, and verifies the authentication information that is presented by a CSCD 110.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

One-Time Authentication Tokens

Authentication tokens, such as the RSA SecurID® user authentication token commercially available from RSA Security Inc. of Bedford, Mass., U.S.A., are typically time-based, meaning that they produce new passcodes in fixed predetermined time intervals T, called epochs. For instance, SecurID® produces a new passcode every one minute epoch.

Figure 2:
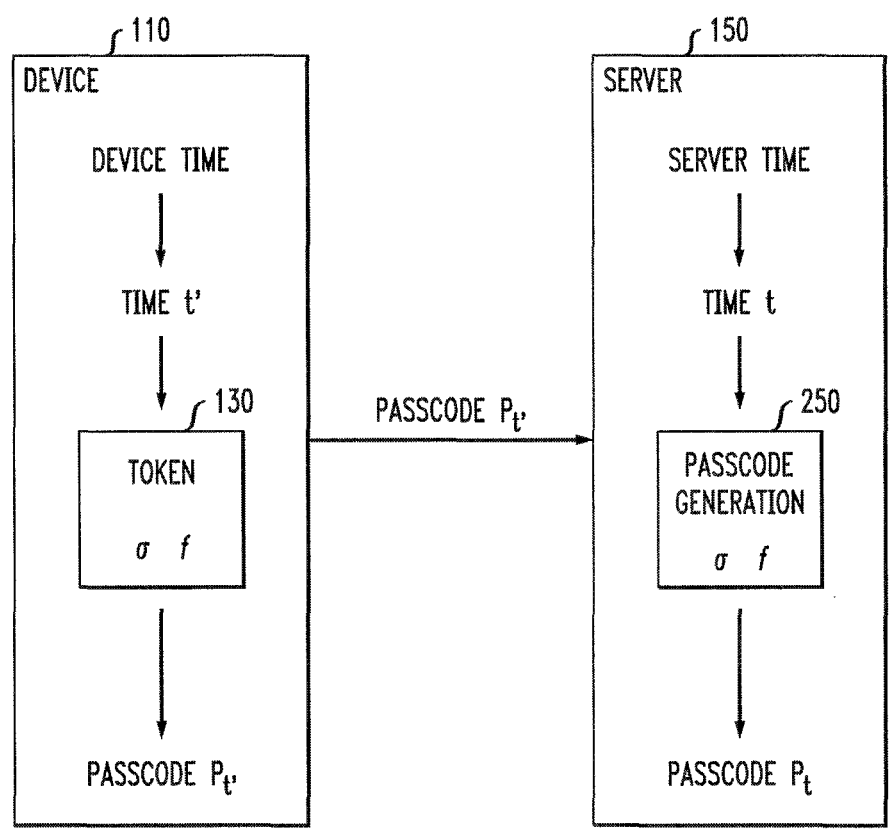
FIG. 2 illustrates a user device attempting to authenticate to a server using a passcode generated by a token.

FIG. 2 illustrates a user device 110 attempting to authenticate to a server 150. The user device 110 authenticates to the server 150 by providing the passcode $P_{t'}$ that corresponds to the current time t' (at the epoch level, e.g., minute) that the device 110 knows. Then, as shown in FIG. 2, the server 150 must authenticate a user who provides a candidate passcode P' by first recomputing the passcode $P_t$ using a passcode generation block 250 that corresponds to the current time t (at the epoch level) that the server 150 knows, and then accepting the submitted passcode if and only if $P'=P_t$. It is clear that if t'≠t, that is, if the token 130 and server 150 are not synchronized with each other, even a legitimate user cannot be authenticated.

A passcode $P_{t'}$ that is produced in time epoch t' is typically generated by the token 130 by applying a one-way cryptographic function $f$ on the current time epoch t', specified by the token's current time and the seed σ of the token 130. Software tokens 130 specify their current time based on the host's device current time, whereas hardware tokens 130 specify their time implicitly through the use of a time-based counter.

A produced passcode $P_{t'}$ may then be transmitted to the authentication server 150 in order to authenticate a corresponding user to the server 150 for accessing a protected resource 170 through a high-level application. The transmission of the passcode $P_{t'}$ to the server 150 may happen either in a user-based manner, typically by typing performed by the user to an API provided by the high-level application, or in a user-agnostic manner, typically by an automatic way where a software token 130 is directly communicating to the server 150 through a communication channel offered by the host device, referred to as a connected token 130.

In turn, on receiving the received candidate passcode $P_{t'}$, the server 150 verifies this passcode by contrasting it against the passcode $P_t$ that is locally computed by the server 150, accepting the passcode if and only if $P_{t'}=P_t$. If the passcode is not accepted, the user is not authenticated to access the protected resource 170; otherwise, the user is authenticated if and only if the user's PIN is correct. Passcode $P_t$ is computed by the server 150 by applying the same function $f$ on the current time epoch t' specified by the server's current time and the seed σ of the token 130 that is stored by the server 150. Often, in order to tolerate small discrepancies between the current time of the software (or hardware) token 130 and the current time of the server, $P_{t'}$ is also contrasted against another 2s passcodes within a slack window that are defined by epochs that are neighboring epochs to the server's epoch t, that is, to passcodes $\{P_{t-s}, \ldots, P_{t-1}, P_t, P_{t+1}, \ldots, P_{t+s}\}$. That is, one or more passcodes are computed locally by the server 150 based on a slack window of epochs of size 2s and on the knowledge of the underlying seed of the token 130.

Produced passcodes are pseudorandom based on the use of the one way function $f$. Thus, as long as the seed remains secret, protected against leakage to an attacker, future passcodes remain unpredictable even if an attacker has observed an arbitrarily long history of passcodes produced in the past.

Threats Related to Seed Leakage

As indicated above, there are three forms of attack that an attacker can employ to obtain access to the secret seed of the token of a target victim user. Under a server compromise attack, the attacker compromises the authentication server 150 and obtains the secret seed of the tokens 130 of one or more users. With a token tampering attack, the attacker compromises the token 130 and obtains the secret seed of the token 130. Finally, with a seed-record capture attack, the attacker obtains the secret seed of the token 130 indirectly by attacking a storage or communication unit used to store or transfer the token's seed or through side-channel attacks performed against the token 130 or the server 150.

Considering a worst-case scenario, it is assumed that the attacker has access to the PIN of the user, and therefore is actively operating towards getting access to the secret seed in order to clone the token 130.

Server Compromise

The attacker may compromise the authentication server 150 and get the secret seed of the tokens 130 of one or more users. In the best case, the attacker will compromise the server 150 ephemerally, i.e., by instantly stealing the seed(s) and then terminating the attack. Although this is enough for cloning one or more of the tokens 130, there is a stronger type of attack where the attacker compromises the server permanently, i.e., the attacker may remain in control of the server for a long or unlimited in the future period of time, thus directly being able to impersonate one or more users. Therefore, any type of solution guarding against server compromise must also consider this stronger attack version. Server compromise may itself be part of, or the target of, a sophisticated advanced persistent threat against an organization or an enterprise.

Token Tampering or Compromise

The attacker may compromise the token 130 and obtain the secret seed of the token 130. For software tokens 130, this corresponds to performing a direct attack against the host device 110, where the host device 110 gets compromised using some malware, trojan, or virus installed on the device or through some network-based attack; once the device 110 is compromised and the attacker has full control of the device 110, the attacker can bypass any protection mechanisms being in place by the token application 130 for restricting access to the token's seed. For hardware tokens 130, this corresponds to physically tampering with the token 130 to get access to its internal memory or processor where the seed is stored or lied, e.g., by opening the case of the token and reading the full internal state of the token at the time of compromise.

Seed Capturing

The attacker may get the secret seed of the token 130 indirectly by attacking a storage or communication unit used to store or transfer the token's seed or through side-channel attacks performed against the token 130 or the server 150. In particular, often records of the seeds of the users' tokens must be kept for usability, back-up, legal or compliance purposes. Or, software tokens 130 must be provisioned at the beginning of their operation using some protocol that relies on some type of communication between the host device 110 and the server 150, e.g., using a web service or an email message. Accordingly, an attacker may get access to one or more seeds by directly attacking these storage or communication media, i.e., by getting access to the seeds while the seed are in rest or in transit. Moreover, an attacker may perform sophisticated side-channel attacks against the token 130 or the server 150 in order to harvest the secret seed. For instance, power analysis attacks can be used for this purpose. Note that these types of attacks are particularly hard to detect or prevent as the token 130 or the server 150 are not involved in, or directly affected by, the attack.

Design Framework for One-Time Authentication Tokens

A general design framework is provided that results in concrete architectural designs for one-time authentication tokens 130 that enjoy one or more intrusion-detection and intrusion-resilience technologies which help mitigate the harm inflicted by the attack vectors described above.

Figure 3:
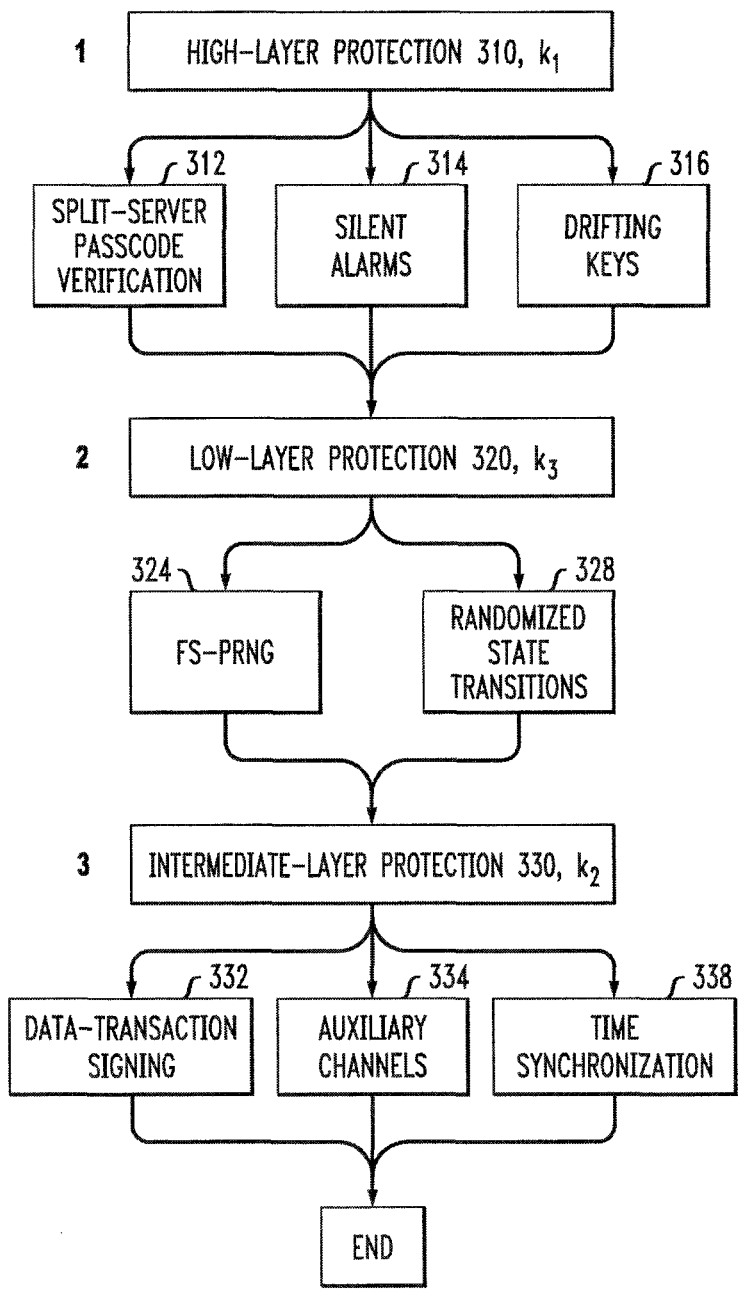
FIG. 3 illustrates an exemplary design framework incorporating aspects of the present invention.

FIG. 3 illustrates an exemplary design framework 300 incorporating aspects of the present invention. As discussed hereinafter, the exemplary design framework 300 applies at least one of three protection layers: high-layer protection 310, low-layer protection 320, and intermediate-layer protection 330, to the basic design of cone-time authentication tokens 130.

The high-layer protection 310 optionally employs one or more of the following intrusion-detection and intrusion-resilience technologies: split-server passcode verification 312, silent alarms 314 and drifting keys 316, each discussed further below in a corresponding section. The technologies in the high-layer protection 310 detect and tolerate attacks based on the leakage of seeds in general and typically involve both the token and the server. Thus, the high protection layer 310 establishes token-server mechanisms guarding against at least one of the three possible threat settings described above, namely, server compromise, token tampering/compromise and seed-record capturing. When at least one of these technologies is employed, enabling these technologies in the same design entails some challenges as these technologies need to be properly integrated into a fully functional one-time authentication token 130. The disclosed framework 300 presents a novel way to seamlessly integrate these technologies, as discussed hereinafter.

The low-layer protection 320 optionally employs one or more of the following tamper-resistance technologies: forward-secure pseudorandom number generators 324, use of a source of randomness at the token, and randomized state transitions 328, each discussed further below in a corresponding section. The technologies in the low-layer protection 320 tolerate attacks based on the leakage of the seed at the token 130 and typically involve only the token 130. Thus, the low protection layer 320 establishes token-side mechanisms guarding against full or partial secret-state leakage. Again, the exemplary framework 300 presents a novel way to integrate these technologies with the technologies offered by the high protection layer 310.

The intermediate-layer protection 330 optionally employs one or more of the following token-visibility technologies: data-transaction signing 332, auxiliary channels 334 and time synchronization 338, each discussed further below in a corresponding section. The technologies in the intermediate-layer protection 330 achieve better coordination between the token 130 and the server 150 and typically involve the communication of some side information from the token 130 to the server 150. Thus, the intermediate protection layer establishes communication mechanisms enabling and enhancing the token-side visibility. Once again, the exemplary framework 300 presents a novel way to seamlessly integrate these technologies with the technologies offered by the high and low protection layers.

High-Layer Protection Technologies 310

The exemplary framework 300 employs any set of the following three solution concepts for the design of one-time authentication tokens 130 so that intrusion-detection and intrusion-resilience is achieved.

1. Split-Server Passcode Verification 312: As described in U.S. patent application Ser. No. 13/404,737, filed Feb. 24, 2012, entitled "Method and Apparatus for Authenticating a User Using Multi-Server One-Time Passcode Verification," (now U.S. Pat. No. 9,118,661), split-server passcode verification is a solution concept for tolerating compromise(s) of the server 150 in systems that employ one-time authentication tokens 130. Generally, this solution employs distributed cryptographic techniques for dispersing the task of verifying a candidate passcode (provided by a user or token 130) among two or more verification servers 150 so that each such participating server $S_i$ stores only a partial secret state $\sigma_i$. Token's seed $\sigma$ is split or shared into two or more pieces each managed by a separate server 150. One security property offered by a split-server passcode verification protocol 312 is that verification is securely implemented in a distributed manner, yet leakage of one or more, but up to a specified threshold, partial secret states does not compromise the security of the token 130.

In a typical case, the seed is split into two pieces, often called the red and the blue partial seeds, and two verification servers 150 are employed: the red server (150-red) stores the red seed and the blue server (150-blue) stores the blue seed. Upon receiving a candidate passcode $P_{t'}$, the two servers 150-red and 150-blue interact through a secure protocol to jointly compute the passcode $P_t$ against which the candidate passcode is contrasted, and accordingly $P_{t'}$ is rejected if any of the two servers 150-red or 150-blue outputs "reject." This decision is typically made by a so-called relying server that is stateless and responsible for the final decision about the acceptance of $P_{t'}$ based on the individual outputs of the red and the blue servers 150-red and 150-blue.

The additional feature of proactivization can be used according to which the partial states of the (e.g., two) servers 150 evolve over time and where the servers periodically exchange secure descriptions (e.g., hashes) of their partial secret states, which are then used to create their new partial secret states.

2. Silent Alarms 314: As described in U.S. patent application Ser. No. 13/404,788, filed Feb. 24, 2012, entitled "Methods and Apparatus for Silent Alarm Channels Using One-Time Passcode Authentication Tokens," silent alarms detect token tampering or compromise and eventually prevent certain impersonation attempts by an attacker. Generally, the silent alarm solution employs a secret silent alarm state that instantly changes once the token 130 (software or hardware) senses or detects a suspicious activity that indicated possible token compromise.

This state change corresponds to, for example, the raising of one or more special alert flags but the change itself is performed in a forward-secure and stealthy manner so that, even after the complete compromise of a token 130 by an attacker, the silent alarm state alone is not indicative of whether or not any alert flag has been raised—thus, the alert flags serve as a silent alarm. One security property offered by a silent alarm 314 of a token 130 is that the silent alarm state and, therefore, the alert flags, remain secure with respect to their integrity and confidentiality, i.e., an attacker that learns the complete state of the token 130 after the compromise does not learn if any alert flag was ever raised and cannot tamper with any alert flag.

Using an appropriate auxiliary channel, discussed further below, these alert flags can be embedded into the passcodes that are produced by the token 130, and thus transmitted to the authentication server 150. Using an appropriate decoding of these alert flags, the authentication server 150, in turn, can eventually learn about the one or more raised alert flags and appropriately handle the verification and acceptance of the received candidate passcode. In particular, such alert flags can be used to encode alert messages related to a possible compromise of the token 130; thus receipt of such messages by the server 150 corresponds to detection of a possible compromise of the token 130.

When such compromise is detected, the server 150 may appropriately change its verification procedure according to some passcode acceptance policy. For instance, if a low-risk alert message is received, the server 150 (and the high-level application) may restrict the access that the user gets into the protected resource 170, or if a high-risk alert message is received, the server 150 may immediately reject the authentication or fake an authentication success only to identify the origin on the impersonation attack. Successful decoding of an embedded alert flag into a passcode is a probabilistic event that happens with some positive probability: the alert flag will be eventually received in one of the next few transmitted passcodes, i.e., false negatives exist. However, false positive do not exist: A received alert flag will always indicate a suspicious (according to some token-side alert-generation policy) event happening at the token 130.

3. Drifting Keys 316: As described in U.S. patent application Ser. No. 13/250,225, filed Sep. 30, 2011, entitled "Key Update With Compromise Detection," (now U.S. Pat. No. 8,699,713), drifting keys detect token cloning and eventually preventing certain impersonation attempts by an attacker. Generally, the drifting keys solution employs a drifting key state that changes over time randomly. This random state change corresponds to a dynamically evolving and unique fingerprint (i.e., characteristic key) of the (software or hardware) token 130 that is being randomly updated at some low rate (e.g., a few new random bits are added to the state every week, i.e., bits are randomly drifted over time).

As these small changes in the token's fingerprint are embedded into the produced passcodes and as these passcodes are received and accepted by the server 150, the server gradually learns the partial or complete state of the token's fingerprint (depending on how often passcodes are received by the server, thus, on how often the user makes use of the token 130). One security property offered by a drifting key 316 of a token 130 is that the drifting key state and, therefore, the token's randomized fingerprint, remain unique over time; therefore if a cloned token 130 starts reporting corresponding cloned drifting key updates to the server 150, these updates will not match the drifting key updates reported by the original, cloned, token 130. Therefore, as long as the original token 130 and the cloned one are being used simultaneously by the legitimate user and the attacker, respectively, with overwhelming probability the server 150 will notice a divergence or inconsistency in the learned fingerprint of the token 130.

That is, the drifting key states of the original and the cloned tokens will necessarily eventually be forked away from each other which is a detectable event. Even if the server 150 will not be able to distinguish the cloned token 130 from the original one, the server 150 will be alerted that a possible cloning attack has been performed and will react according to a certain policy being in place.

As with the silent-alarm messages, drifting key updates are being embedded in the passcodes using an appropriate auxiliary channel, discussed further below. Using an appropriate decoding of these updates, the authentication server 150, in turn, can eventually learn about the one or more inconsistencies in the token's unique fingerprint, even if the server 150 has only a partial view of the original token's fingerprint. Again, successful decoding of an embedded drifting key update into a passcode is a probabilistic event that happens with some positive probability: the update will be eventually received in one of the next few transmitted passcodes, i.e., false negatives exist. However, false positive do not exist: A received inconsistent drifting key update will always indicate a cloning attack against the token 130.

By employing any combination of these intrusion-detection and intrusion-resilience technologies, the exemplary design framework 300 achieves a unique property of protecting against one or more vectors of attacks that are related to the cloning of one-time authentication tokens. In particular, the exemplary framework 300 ensures that tokens 130 are protected against leakage of seeds in settings where:

- only server compromise or token tampering/compromise or seed-record capturing occurs;
- or both server compromise and token tampering/compromise occurs;
- or both server compromise and seed-record capturing occurs;
- or both token tampering/compromise and seed-record capturing occurs.

Low-Layer Protection Technologies 320

The exemplary framework 300 also employs any set of the following two solution concepts that enhance the security of one-time authentication tokens 130 with respect to token-side leakage of the secret state (i.e., the seed).

1. Forward-Secure Pseudorandom Number Generator 324: As described in U.S. patent application Ser. No. 13/334,709, filed Dec. 23, 2011, entitled "Methods and/or Apparatus for Generating Forward Secure Pseudorandom Numbers," (now U.S. Pat. No. 9,008,303), forward security can be applied to management of the internal state of one-time authentication tokens 130. Instead of using a fixed global secret state, e.g., a seed, for the entire lifetime of the token 130, thus risking leakage of this global state that results in perfect cloning of the token 130, forward security involves requiring that the secret state of the token evolves over time in a one-way cryptographic manner so that older states cannot be computed (by a polynomial bounded attacker) from newer states. In the simplest case, for instance, the seed may evolve over time, e.g, every elementary time epoch in which a new passcode must be produced, through the use of a one-way hash chain. That is, the new secret state is the hash of the current secret state, which gets immediately deleted by the token after the new state is produced. The security property offered by such a forward-secure approach is that if an attacker compromises the token 130 and captures its current secret state, although all future states can be perfectly simulated, no older state can be computed by the attacker. One advantage of this approach is that it is possible to protect, even post-compromise, some important past state of the token 130, which in turn can be used to communicate to the server 150 important information about the token's posture.

A hash chain, however, introduces some computational overhead proportional to d (both at software tokens and at the server) when a current state, corresponding to current time, must be computed from an old state, corresponding to a time in some distance d in the past. It is possible to employ hierarchical hash chains that reduce this "catch up" computation cost to approximately log d, at the slight cost of increasing the state size by a factor of d.

2. Randomness Source: A source of (true) randomness at the token 130 is used to produce a series of random bits at some desired rate.

3. Randomized-State Transitions 328: As described in U.S. patent application Ser. No. 13/828,588, filed Mar. 14, 2013, entitled "Randomizing State Transitions for One-Time Authentication Tokens," certain portions of the state of a token 130 are more likely to leak to an attacker compromising a token 130, if the attacker schedules the compromise at the beginning of the predetermined elementary time epoch during which new passcodes are generated (e.g., close to the passcode generation, at the beginning of the periods that last one minute). By then randomizing the exact time windows (e.g., duration and placement in time of these windows) during which passcodes are generated, it is possible to mitigate these special type of inference attacks. A random or a pseudorandom source can be used at the token 130 for randomizing state transitions.

By employing any combination of these tamper-resistance technologies 324, 328, the exemplary design framework 300 achieves the property of protecting against token-side leakage of the secret state of the token 130.

Intermediate-Layer Protection Technologies 330

The exemplary framework 300 employs any set of the following three solutions that enhance the security of one-time authentication tokens 130 with respect to token-side visibility.

1. Data-Transaction Signing 332: As described in U.S. patent application Ser. No. 13/826,924, filed Mar. 14, 2013, entitled "Event-Based Data Signing via Time-Based One-Time Authentication Passcodes," it is possible to extend the basic functionality of the tokens 130 so that the passcodes produced by the token 130 can authenticate not only the user but also some data produced by the high-level application. In particular, the token 130 may be extended to receive from the high-level application some data which participates in the generation of the next passcode produced by the token 130. This passcode then serves as a signature of this data and, when received by the server 150, this passcode can be used to verify the validity of the corresponding data transaction that took place at the high-level application. In particular, the high-level application provides the server 150 with the data that is to be verified, and this data transaction is accepted only if the locally produced passcode on this provided data matches the passcode that was received by the token 130.

2. Auxiliary Channel 334: As described in U.S. patent application Ser. No. 13/404,780, filed Feb. 24, 2012, entitled "Method and Apparatus for Embedding Auxiliary Information in One-Time Passcode Authentication Tokens," (now U.S. Pat. No. 8,984,609), it is possible to embed a small number of auxiliary information bits into the produced passcodes of a token 130. These embedded bits can then be reconstructed by the server 150, thus implementing an auxiliary channel between the token 130 and the server 150. This channel is typically a channel of low bandwidth and a small number of bits, for instance, 4 bits are embedded. Such channels are designed so that they are resilient to small-digit typographical errors performed by the user transcribing a passcode. Typically, an error correction code is used to encode the auxiliary word that is to be embedded into the passcode, and this embedding corresponds to adding the resulted codeword to the initial passcode.

3. Time Synchronization 338: As described in U.S. patent application Ser. No. 13/826,993, filed Mar. 14, 2013, entitled "Time Synchronization Solutions for Forward-Secure One-Time Authentication Tokens," and in U.S. patent application Ser. No. 13/728,271, filed Dec. 27, 2012, entitled "Forward Secure Pseudorandom Number Generation Resilient to Forward Clock Attacks," (now U.S. Pat. No. 9,083,515), it is possible that software tokens 130 get out of synchronization with the server 150, which in turn can lead to usability problems. For instance, a user may not be able to successfully log-in if the token's device time is put forward in the future. Or worse, the token 130 may not be able to even produce a passcode if the time is later corrected but forward security is used.

In fact, the lack of synchronization may even lead to a special type of security attack called a forward clock attack, where the attacker makes use of future times of the host device 110 to harvest a series of passcodes that are valid in the future and then correct the device time at the end. It is possible to employ certain time-synchronization solutions so that the token 130 manages to communicate to the server 150, directly or indirectly, with or without user intervention, that such an attack has occurred and so that the token 130 additionally is re-synchronized with the server 150.

By employing any combination of these token-visibility technologies, the exemplary design framework 300 achieves the property of communicating to the server 150 the token's posture assessment, thus enabling better coordination between the token 130 and the server 150 and more timely detection of certain types of attacks.

FIG. 4 illustrates exemplary pseudo code for designing a one-time passcode token 130 in accordance with the framework 300 of FIG. 3. As shown in FIG. 4, a one-time passcode token 130 can be designed as follows:

1. Select high-layer protections 310. Select $k_1 \geq 0$ features (technologies) for high-layer protection 310;

2. Select intermediate-layer protections 330. Select $k_2 \geq 0$ features (technologies) for intermediate-layer protection 330; and 3. Select low-layer protections 320. Select $k_3 \geq 0$ features (technologies) for low-layer protection 320;

where it holds that $k_1+k_2+k_3>2$. Overall, the general design framework 300 can lead the design of a rich set of architectures for security-enhanced implementations of one-time authentication tokens 130.

The following dependency rules are optionally enforced when using the general design framework 300 for one-time authentication tokens 130:

1. Split-server passcode verification (312) with proactivization and silent alarms (314) each require a forward-secure pseudorandom generator (324).

2. Randomized state transitions (328) require one of a forward-secure pseudorandom generator (324) and a randomness source (not shown in Figures). The forward security aspect of the pseudorandom generator is not critical, however.

3. Drifting keys (316) and silent alarms (314) require an auxiliary channel (334).

4. Drifting keys (316) require a randomness source (not shown in Figures).

As used herein, the term "configurable" refers to the design, configuration and/or reconfiguration of a configurable one-time authentication token.

Design & Configuration: By employing the exemplary general design framework 300 to select among one or more of security and functionality features, a concrete architecture for one-time authentication tokens is designed and adopted that defines (1) the number and type of individual core modules of the architecture, (2) the exact mode of operation of these core modules, and (3) the exact interconnection of these core modules. This main design can successively be configured according to several specification, parameterization and tuning criteria. These criteria involve, for instance, (1) the structure, format and sizes of internal token state, (2) the format and sizes of produced pseudorandom information, (3) the exact instantiation and implementation of the underlying cryptographic operations, and (4) the exact instantiation and implementation of the underlying coding schemes. These type of token configuration occurs at manufacture and/or at system initialization by the system administrator and before the usage of the token by the user.

Reconfiguration: For software tokens, and with the exception of the forward security aspect of a token, any of the above features are tunable, and therefore the token operation is reconfigurable. In particular, even after the start of the usage of the token by the user, one or more design features can be activated or deactivated as desired or needed by the use case, or some initial configuration parameters can be tuned as desired by the system administrator of the one-time authentication token. For instance, during a software update cycle, the token application may be reconfigured to employ one or more different features or use one or more different parameters. This reconfiguration may or may not require the user notification or training. Overall, every technical feature of the system is autonomous and for software tokens every such feature can be effectively dynamically enabled or dis-activated.

Breach-, Tamper- and Cloning-Resistant Tokens

Figure 5:
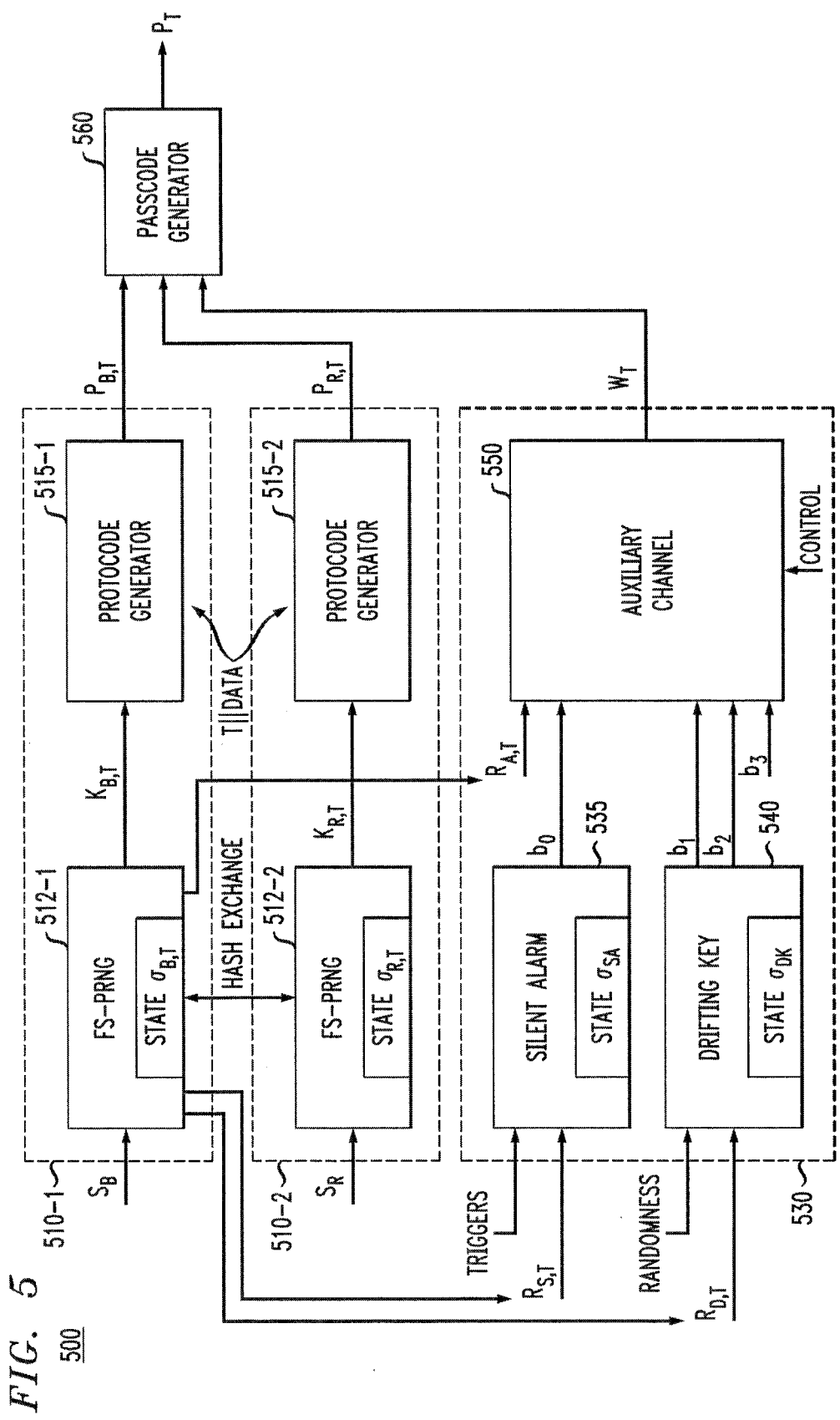
FIG. 5 illustrates a configurable breach-resilient, tamper-resistant and cloning-resistant one-time authentication token in accordance with aspects of the invention.

FIG. 5 illustrates a breach-resilient, tamper-resistant and cloning-resistant one-time authentication token 500 in accordance with aspects of the invention. Among other benefits, the authentication token 500 of FIG. 5 adheres to the general design framework 300 of FIG. 3. As used herein, the terms "breach-resilient, tamper-resistant and cloning-resistant" are collectively referred to as "security-enhanced". Thus, a security-enhanced one-time authentication token 500 is provided with several important security and functional properties.

Security Features (a) Tamper-Resistant Technologies i. Forward Security: The internal secret state of the exemplary token 500 evolves over time in a forward-secure manner so that if the token 500 is compromised, all past transmissions/operations of the token 500 remain secure, and certain states related to the detection of cloning attacks remain secure.

ii. Randomized State-Update Timing: The internal state of the exemplary token 500 changes in unpredictable time units further limiting the attack window during which the compromise of the token reveals information to the attacker about whether its attack was detected by the token 500.

(b) Anti-Cloning Technologies i. Silent Alarms: Assuming certain tampering events are detectable by the token 500, the exemplary token 500 can securely and privately transmit an alert to the authentication server 150 notifying the server 150 about this tampering event. This holds true even after the complete compromise of the token 500 by an attacker.

ii. Drifting Keys: The secret state of the exemplary token 500 evolves over time in a random, and therefore unpredictable manner, so that any cloning of the state is guaranteed to be eventually detected by the authentication server by observing diverging or forking states at the server through detectable inconsistencies.

(c) Anti-Breach Technologies i. Split Secret State: The secret state of the exemplary token 500 is split into two parts so that the authentication server 150 can itself be split into two servers: Then, the system guarantees that as long as these two servers 150 do not simultaneously get ephemerally compromised within one certain period of time (e.g., one week), the security of the token's functionality is preserved. Additional but slightly weaker security properties hold if a server 150 gets permanently compromised.

(d) Side-Channel Tolerant Technologies i. Secret-State Updates: The internal secret states of the exemplary token 500 and the server(s) 150 evolve over time (in a forward-secure manner) at a high update rate; therefore the secret states are hard to leak to an attacker through side-channel attacks.

Functional Features (a) Modes of Operations i. User-Based OTP: This is the standard use case where a user transcribes a one-time 6 or 8 digit one-time (authentication) passcode or one-time passcode (OTP).

ii. User-Based Transaction Signature: The user can also transcribe a one-time 6 or 8 digit transactional data signature through a special passcode that serves as a signature of some data related to a transaction between a client and the server performed over a high-level application.

iii. Connection-Based OTP: This case is as in the user-based OTP mode of operation, but now the OTP is transmitted automatically by the token 500 and through the high-level application, without the user's help, referred to as "long OTP," as this passcode can be of an arbitrarily long size.

iv. Connection-Based Transaction Signature: As in the user-based transaction signature mode of operation, but now the signature is transmitted automatically by the exemplary token 500 and through the high-level application, without the user's help, referred to as "long OTP signature," as this passcode can be of an arbitrarily long size.

(b) Auxiliary Channels i. Auxiliary-Information Channel 334: This auxiliary channel is designed to secretly embed a small number of bits (e.g., 1 to 4 bits) into the transmitted passcode in a manner that is resilient to user-introduced transcription errors.

ii. Time-Synchronization Channel 338: The channel is designed to allow to transmit time-related information to the server.

(c) Tunable Operation i. Reconfiguration: For software tokens, and with the exception of the forward security aspect of the token 500, any of the above features are tunable, and therefore the token operation is reconfigurable. In particular, even after the start of the usage of the token by the user, one or more design features can be activated or deactivated as desired or needed by the use case, or some initial configuration parameters can be tuned as desired by the system administrator of the one-time authentication token. For instance, during a software update cycle, the token application may be reconfigured to employ one or more different features or use one or more different parameters. This reconfiguration may or may not require the user notification or training. Overall, every technical feature of the system is autonomous, and for software tokens, every such feature can be effectively dynamically enabled or dis-activated.

As demonstrated next, the exemplary design of the token 500 involves several novel ideas related to a fully multi-operational end-to-end one-time authentication token 500 that achieves the properties discussed above. Additionally, the exemplary design is unique especially with respect to how different existing solutions concepts and technologies are combined in a novel way to provide a sophisticated, yet flexible, design for one-time authentication tokens. The exemplary design also includes an elaborate server-side split-state verification protocol that extends the basic {accept,reject} output range of the server 150 to a richer set of outputs that are related to assessing the security posture of the token and taking appropriate action when certain events are detected.

Main Architecture

As shown in FIG. 5, the architecture of the exemplary token 500 comprises three main portions:

1. The blue protocode-generation portion 510-1;
2. The red protocode-generation portion 510-2; and
3. The auxiliary-information portion 530.

Protocode-Generation Portions 510-1 and 510-2

The protocode-generation portions 510-1 and 510-2, referred to as the blue and red protocode-generation parts, are almost identical in their functionality with one another, described as follows:

1. As shown in FIG. 5, an FS-PRNG module 512 in each portion 510 implements a forward-secure pseudorandom generator where, given an initial seed, seed $s_B$ (or $s_R$ respectively) and the current time epoch T as input, the blue (or the red respectively) FS-PRNG module 512 produces a forward-secure pseudorandom key $K_{B,T}$ (or $K_{R,T}$ respectively). This key $K_{B,T}$ (or $K_{R,T}$ respectively) is produced in regular predetermined time intervals, every elementary time epoch T, e.g., every minute. The initial seed $S_B$ (or $S_R$ respectively) is used to produce some initial corresponding FS-PRNG state $\sigma_B$ (or $\sigma_R$ respectively), where the seed gets deleted immediately after producing this initial state. At every time epoch T, given the current FS-PRNG state $\sigma_{B,T}$ (or $\sigma_{R,T}$ respectively), the blue (or red respectively) FS-PRNG updates its state to new FS-PRNG state $\sigma_{B,T}'$ (or $\sigma'_{R,T}$ respectively) and output key $K_{B,T}$ (or $K_{R,T}$ respectively) where state $\sigma_{B,T}$ (or $\sigma_{R,T}$ respectively) is immediately deleted after this.

The only difference between the blue and red FS-PRNGs 512-1 and 512-2 is that at each time epoch T the blue FS-PRNG 512-1 additionally outputs some forward-secure pseudorandom values $R_{N,T}$, $R_{D,T}$ and $R_{A,T}$ to the auxiliary-information portion 530.

All pseudorandom keys and values are binary strings of some certain appropriate length, namely of lengths $|K_{B,T}|=|K_{R,T}|$, $|R_{S,T}|$, $|R_{D,T}|$ and $|R_{A,T}|$ specified by the exact parameterization of the one-time authentication token 500.

Additionally, each FS-PRNG module 512 employs the following four features:

Pre-Computation of Pseudorandom Keys. Values: For efficiency reasons, the set of pseudorandom keys and values that correspond to epoch $\tilde{T}$ which is a small multiple of epoch T are precomputed and stored in the token. For instance $\tilde{T}$ may be an epoch of length 4 times longer than epoch T (e.g., pre-computation occurs every 4 minutes). Each of these keys or values are immediately deleted as soon as they are being used by the token 500.

Hierarchical State Transitions: The FS-PRNG state is composed into partial FS-PRNG states so that a hierarchy is induced among them, according to a structure that has the form of a tree of chains, so that state transitions can be implemented fast both sequentially and in (bigger) steps: That is, the new state may either correspond to the next time epoch of the current epoch or to an epoch that is further away in the future from the current (most recently used) epoch. Partial FS-PRNG states correspond to time epochs of different lengths and state transition in steps can occur by employing the appropriate subset of these partial states to compute new (intermediate) partial states that are immediately deleted as soon as they used by the token.

For instance, the FS-PRNG state may consist of partial states corresponding to months, weeks, days, hours and minutes. Then, to transition to the new FS-PRNG state that corresponds to a step of 3 months and 6 days, the partial month state is used to generate in a hash chain 3 new partial month states, and the one-but-last such month state is used to generate in a hash tree a new partial day state corresponding to the first day in this month. Then, this new partial day state is used to generate in a hash chain 6 new partial day states, and the one-but-last such state is iteratively used in a hash tree or a hash chain to produce the final pseudorandom key and values corresponding to the new epoch T. The total number of partial state transitions are much smaller than the transitions required to sequentially generate the new FS-PRNG state.

Finally, partial state transitions are performed by employing a cryptographic hash function, where a different such function, or the same function on different control inputs, is used for each hash chain or hash tree transition in different levels of the hierarchy of partial states.

Randomized State Transitions: The above partial state transitions may occur in a time window that starts in a random point in time. However, the new randomized scheduling of these partial state transitions is such that the total ordering of these transitions remains the same.

Figure 6:
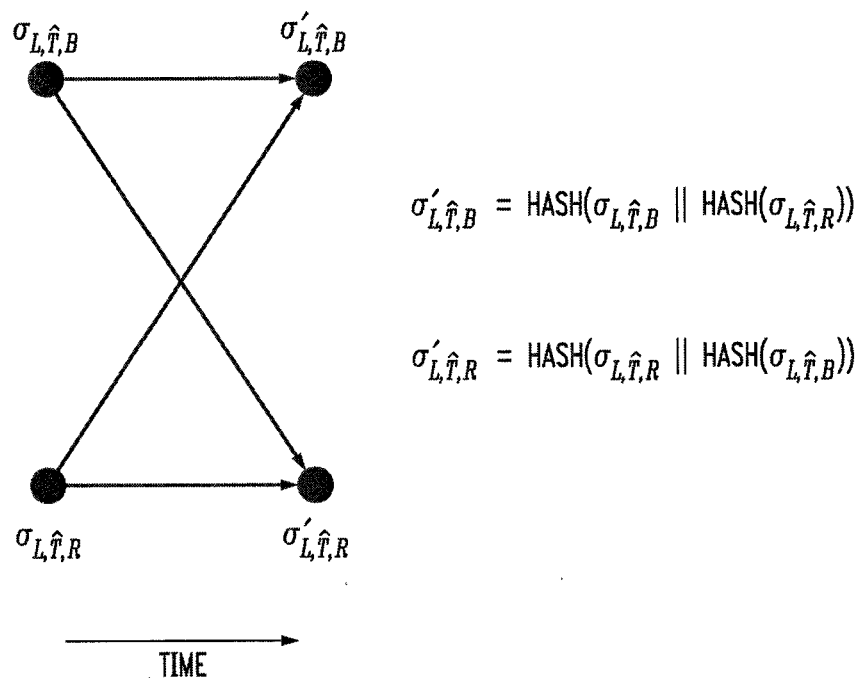
FIG. 6 illustrates the exchange of a cryptographic hash of partial states at regular predetermined time intervals by two forward secure random number generators.

Pro-Activation of Secret States: As shown in FIG. 6, at regular predetermined time intervals $\hat{T}$, defined by the partial states $\sigma_{L,\hat{T}}$ of the FS-PRNG states, the blue and red FS-PRNG modules 512 exchange a cryptographic hash of their partial states $\theta_{L,\hat{T},B}$ and $\sigma_{L,\hat{T},R}$. Here, partial states $\sigma_{L,\hat{T},B}$ and $\sigma_{L,\hat{T},R}$ correspond to the time epoch $\hat{T}$ that is of the longest duration (e.g., one month) and that is associated to level L of the hierarchy of partial states. That is, the blue and red FS-PRNG modules exchange a cryptographic hash of their partial states corresponding to the current month. The blue (resp. red) FS-PRNG uses this received red (resp. blue) hash value as an additional input for the next transition of its partial state $\sigma_{L,\hat{T},B}$ (resp. $\sigma_{L,\hat{T},R}$).

2. As shown in FIG. 5, a protocode-generator module 515 in each portion 510 implements the generation of a preliminary passcode called protocode. The blue and red such modules 515-1 and 515-2 operate identically. The blue module 515-1, for instance, operates as follows. Each time epoch T (e.g., one minute) that a new passcode must be produced, the module 515-1 uses the pseudorandom key $K_{B,T}$, the current time epoch T and optionally an additional data input D to produce a protocode $P_{B,T}$. This protocode comes from the same range of values as a regular passcode, typically, a 6- or 8-digit number, but it is not the final output of the token 500 for this time epoch T.

Instead, a different passcode $P_T$ will be produced as final output of the token for epoch T as described below. Protocode $P_{B,T}$ is computed by applying a one-way cryptographic function on the pseudorandom key $K_{B,T}$ and an additional input that is of the form T or T|| $D_T$, where T is the current time epoch of the token and $D_T$ is an optional additional input related to a data transaction performed by a high-level application that the token communicates with. Whenever the token has such a transactional data $D_T$ input then T|| $D_T$ is used as input, otherwise T is used. For instance, if T|| D, is used as input, then $P_{B,T}$=MAC($K_{B,T}$,T|| $D_T$) where the MAC function is implemented using, e.g., CMAC.

The pseudorandom key $K_B$ used for producing protocode $P_{B,T}$ may either have been produced as output of the blue FS-PRNG module in this epoch T or it may have been precomputed at an epoch T' that is earlier than T.

Again, the protocodes output of the protocode generation are binary strings of the appropriate lengths $|P_{B,T}|$, $|P_{R,T}|$ specified by the exact parameterization of the one-time authentication token 500.

Auxiliary-Information Portion 530

1. As shown in FIG. 5, an auxiliary-channel module 530 encodes a small number of bits, e.g., 4 bits, into a codeword $W_T$ that is used to embed some auxiliary information into the final OTP passcode at time epoch T. In an exemplary setting, this module 530 receives as input 4 auxiliary-information bits, 1 control bit and the pseudorandom value $R_{A,T}$ (that is, an output of the blue FS-PRNG module 512-1 for the same epoch T).

If the control bit is 0, then the module 530 outputs $W_T=0$, which indicates that no auxiliary information will be embedded into the final OTP passcode for epoch T.

If the control bit is 1, then the module 530 produces a decimal codeword of 6- or 8-digits that will embed 1 silent alarm bit $b_{0,T}$, 2 drifting key bits $b_{1,T}$, $b_{2,T}$, and 1 auxiliary bit $b_{3,T}$ into the final OTP passcode for epoch T as follows.

The auxiliary-channel module 550 maps the bits produced by the silent-alarm module 535 and drifting-key module 540 into a decimal codeword. The mapping occurs in three steps:

(a) Concatenate the bits $b_{3,T}$, $b_{2,T}$, $b_{1,T}$ and $b_{0,T}$ into a 4-bit value; if $b_{3,T}$ is a "reserved" unused bit, then the most significant bit is always 0;

(b) Compute an 8-bit extended hamming code from the 4-bit value; and (c) Map the bits of the hamming code to a decimal codeword as follows:
If the bit is 0, it is mapped to a '0' digit;
If the bit is 1, it is pseudorandomly mapped to a digit from '1' to '9', using a 9-bit pseudorandom value (derived) from the value $R_{A,T}$ to select the digit.

The codeword is added, with no carry between digits, to the protocode to produce the passcode. If the passcode is only 6 digits, the process is the same, but only the least significant six digits of the codeword are added to the 6-digit protocode.

2. The silent-alarm module 535 produces a silent alarm bit $b_{0,T}$ for epoch T that corresponds to a pseudorandom sampling or hash value of the silent alarm state $\sigma_{SA}$ of the token 500. In particular, at all times the token 500 maintains a silent alarm state $\sigma_{SA}$ which is a binary string of some appropriate length $|\sigma_{SA}|$ specified by the exact parameterization of the one-time authentication token 500.

This silent alarm state $\sigma_{SA}$ evolves over time in an event-based and forward secure manner. That is, whenever the token 500 detects or senses one or more predetermined events (e.g., that indicate possible compromise), state $\sigma_{SA}$ is instantly changed to value $\sigma_{SA}'=h^{(t)}(\sigma_{SA})$, where h is a cryptographic hash function, $h^{(t)}$ denotes t iterations of function h, that is, for instance, $h^{(3)}(x)=h(h(h(x)))$, and t is a small integer value that depends on the exact event that is sensed by the token 500. Optionally, an additional control input c, which takes on a value coming from a small set of size l, can participate in the above hashing operation, i.e., $\sigma_{SA}'=h^{(t)}(\sigma_{SA},c)$. The silent alarm state is thus updated at times that are independent of the regular time epochs of the token 500.

At each time epoch T the silent alarm state is sampled in a pseudorandom manner. In particular, the pseudorandom value $R_{S,T}$, output of the blue FS-PRNG module 512-1, and the silent alarm state $\sigma_{SA}$ are combined together through the dot product operation to define bit $b_{0,T}$, i.e., $b_{0,T}=R_{S,T} \cdot \sigma_{SA}$, where $|\sigma_{SA}|=|R_{S,T}|$.

3. A drifting-key module 540 produces two drifting key bits $b_{1,T}$ and $b_{2,T}$ for epoch T that correspond to pseudorandom samplings or hash values of the drifting key states $\sigma_{DK,1}$, and $\sigma_{DK,2}$, respectively, of the token 500, having sizes $|\sigma_{DK,1}|$ and $|\sigma_{DK,2}|$, specified by the exact parameterization of the one-time authentication token 500. The operations of the two states is identical, and in the simplest case, these two states can be set to be at all times the same, i.e., $\sigma_{DK,1}=\sigma_{DK,2}$. Then, in this case, the module operates as follows.

At every time epoch $\hat{T}$ of some predefined length (e.g., every one week, or every 5 days), the drifting key state is being shifted by k positions to the right and new random bits are being inserted into the state, where k is specified by the exact parameterization of the one-time authentication token. Thus, k bits of the state $\sigma_{DK,1}$ are deleted and k random bits are inserted at the beginning of the state.

At each time epoch T the drifting key state $\sigma_{DK,1}$ is sampled twice in a pseudorandom manner. In particular, the pseudorandom value $R_{R,T}$, output of the blue FS-PRNG module, is split into two equal parts $R_{R,T,1}$ and $R_{R,T,2}$, and then each such part and the drifting key state $\sigma_{DK,1}$ are combined together through the dot product operation to define bits $b_{1,T}$ and $b_{2,T}$, i.e., $b_{1,T}=R_{R,T,1} \cdot \sigma_{DK,1}$ and $b_{2,T}=R_{R,T,2} \cdot \sigma_{DK,1}$ where we require that $|\sigma_{DK,1}|=|R_{R,T,1}|=|R_{S,T,2}|$.

4. Finally, as shown in FIG. 5, a passcode-generation module 560 combines the outputs of the blue and red protocol-generation parts 510-1 and 510-2 with the output of the auxiliary-information portion 530 to produce the final OTP passcode.

In particular, for user-based OTPs, the two blue and red protocodes $P_{B,T}$, $P_{R,T}$ are first digitalized into two 6- or 8-digit passcodes $\overline{P}_{B,T}=\text{DIG}(P_{B,T})$, $\overline{P}_{R,T}=\text{DIG}(P_{R,T})$ where DIG is a function transforming binary strings into digital numbers of length 6 or 8; then, these $\overline{P}_{B,T}$ and $\overline{P}_{R,T}$ are combined as $PR_T = \overline{P}_{B,T} \oplus \overline{P}_{R,T}$, where $\oplus$ denotes digit-wise addition module 10 (without carries) to form the combined protocode for epoch T. Finally, the final OTP passcode $P_T$ for time epoch T is defined to be $P_T = PR_T \oplus W_T$, i.e., the combined protocode distorted or shifted by the codeword $W_T$ that is output of the auxiliary-channel module.

For long OTPs, the operation of the module 560 is analogous with the case above but now the digitizing of the protocodes is omitted and the combining operation can be an XOR operation over the binary strings $P_{B,T}$, $P_{R,T}$ and a binary representation of $W_T$, or a binary representation directly related to auxiliary-information bits.

Token-Side Operation

FIG. 7 illustrates exemplary pseudo code for token operation 700 for an exemplary hardware implementation of token 500. As shown in FIG. 7, at the beginning of every time epoch T and for the duration of the lifetime of the token 500, the following operations occur:

Step 0: A carefully chosen random jitter delays or expedites the beginning of the computation of the following steps with respect to the beginning of current epoch T.

Step 1: The blue FS-PRNG module 512-1 sequentially updates the state and computes blue pseudorandom key and values; if T is the beginning of an epoch $\hat{T}$, then pre-computation of such keys and values for some future epochs T is also computed; old used states are immediately deleted. The red FS-PRNG module 512-2 operates similarly. If T corresponds to the beginning of an epoch $\hat{T}$ the red and blue FS-PRNGs 512-1 and 512-2 exchange hashes of their partial states that lie at the higher level of the hierarchy.

Step 2: The combined protocode for epoch T is computed, incorporating any additional transactional data inputted to the token for epoch T.

Step 3: The silent-alarm state is sampled to the silent-alarm bit; if T corresponds to the beginning of an epoch T, then the drifting-key state is updated and shifted; the drifting-key state is sampled to the drifting-key bits.

Step 4: The auxiliary channel 550 maps the auxiliary-information bits to codeword $W_T$, by which the combined protocode is shifted to get the final OTP passcode.

FIG. 8 illustrates exemplary pseudo code for token operation 800 for an exemplary software implementation of a token 500. As shown in FIG. 8, immediately after the launching of the token application, then at the beginning of every time epoch T and for the duration of the running of the token application, the following operations occur:

Step 0a: The token's FS-PRNG, silent-alarm and drifting-key states are retrieved.

Step 0b: A carefully chosen random jitter delays or expedites the beginning of the computation of the following steps with respect to the beginning of current epoch T.

Step 1a: If the current epoch T is the first epoch after the launching of the token application, then the blue and red FS-PRNG modules 512-1 and 512-2 update their states in a step of the appropriate length. If the current epoch T is later in time than the epoch T' that the two FS-PRNG modules 512-1 and 512-2 were lastly used, where T' is encoded in the FS-PRNG states, then update the states to correspond to epoch T" that is the next epoch of T'.

Step 1b: The blue FS-PRNG module 512-1 sequentially updates the state and computes blue pseudorandom key and values; if T is the beginning of an epoch $\hat{T}$, then pre-computation of such keys and values for some future epochs T is also computed: old used states are immediately deleted. The red FS-PRNG module 512-2 operates similarly. If T corresponds to the beginning of an epoch $\hat{T}$ the red and blue FS-PRNGs exchange hashes of their partial states that lie at the higher level of the hierarchy.

Steps 2-4: Same as in the hardware case 700.

Server-Side Operation

The usage of split-server passcode verification 312, requires the use of two server. FIGS. 9A and 9B, collectively, illustrate exemplary pseudo code for server operation 900 for an exemplary split server implementation. As shown in FIG. 9A, upon receipt of candidate passcode $P_T$, the operation of each server 150-blue and 150-red is as follows:

Step 1: The blue server 150-blue maintains the complete history of silent-alarm and drifting-key states and each server 150-blue and 150-red maintains a history of FS-PRNG states related to a slack window of size s around each current time epoch T, where s is specified by the exact parameterization of the one-time authentication token. If the current epoch T is earlier in time than the epoch T' that was lastly used at a server, then the FS-PRNG state is updated in a step of the appropriate length.

Step 2 For each epoch in the slack window:

Step 2a: The blue server 150-blue computes and sends to the red server 150-red all possible codewords $W_T$ for T.

Step 2b: Using commitment schemes, the two servers 150-blue and 150-red exchange their blue and red protocodes, gradually for individual pieces of the protocols, e.g., by exchanging 2 digits 4 consecutive times in the case of 8-digit OTP passcodes. They compute the combined protocode $PR_T$.

Step 2c: For each $W_T$, each server 150-blue and 150-red checks if $P_T = PR_T \oplus W_T$ by performing the following:

Replace each non-zero digit in $W_T$ with a '1' value to obtain the candidate binary codeword.

Check if the binary codeword is a valid hamming code value.

Thereafter, as shown in FIG. 9B.

Step 3: If no Step 2c validates, then each server 150-blue and 150-red outputs "reject." otherwise let $B_{T^*}$* be the matching binary codeword for epoch T*. Then, binary codeword $B_{T^*}$* is decoded to a 4-bit value to get the silent-alarm bit $b_0$ and drifting-keys bits $b_1$ and $b_2$, and each server 150-blue and 150-red outputs "accept." If both servers 150-blue and 150-red output "accept" the user is (conditionally) authenticated according to some server-side policy that is in place.

Step 4: The silent-alarm state is sampled by the blue server 150-blue to get the silent-alarm bit b'. If b'≠$b_0$ then a silent-alarm exception is raised by the blue server 150-blue, and additionally the blue server 150-blue attempts to find the concrete values of t and c with which that the silent alarm test $\sigma_{SA}' = h^{(t)}(\sigma_{SA}, c)$ is validated, where t and c are treated as additional information about the current alerting state of the token.

Step 5: The drifting key bits $b_1$ and $b_2$ are used by the blue server 150-blue to update the drifting-key state and if an inconsistency is observed, using the inconsistency checking described below, a drifting-key exception is raised by the blue server 150-blue.

Drifting Key Inconsistency Checking

Given the two drifting key bits $b_1$ and $b_2$ that are provided to the blue server 150-blue as part of Step 3 above, the blue server 150-blue can update its drifting key state as follows.

The server 150-blue stores a drifting key state value that is equal in size to the drifting key state stored by the token. Each bit of the server state may have three values, '0', '1', or "don't know." The '0' and '1' values correspond to known values determined after a successful authentication during the corresponding interval. The "don't know" value indicates that no successful authentications were received for the token during that interval, so the server cannot determine the drifting key state.

When the blue server 150-blue receives drifting keys $b_1$ and $b_2$, it checks their consistency with respect to the current drifting key state. This consistency check is performed by computing the two pseudorandom mask values corresponding to each bit, then determining if the dot product of the known state and the mask value could equal the candidate $b_1$ and $b_2$ values. If $b_1$ and $b_2$ are both possible dot products, the value is consistent, otherwise it is inconsistent. If the received bits are consistent, then the drifting key state for the current epoch is updated using the equations learned by $b_1$ and $b_2$.

If the number of "don't know" values in the drifting-key state of the blue server 150-blue is large (for example, if the token is used infrequently), it becomes unlikely that inconsistent codewords will be detected. This will reduce the server's ability to detect invalid drifting key states, but will not interfere with normal use of the token 500.

Conclusion

As previously indicated, the above-described embodiments of the invention are presented by way of illustrative example only. Numerous variations and other alternative embodiments may be used, as noted above. The present invention provides new general-purpose techniques for improving resilience to a number of attacks.

Additional details regarding certain conventional cryptographic techniques referred to herein may be found in, e.g., A.

J. Menezes et al., Handbook of Applied Cryptography, CRC Press, 1997, which is incorporated by reference herein.

Advantageously, the illustrative embodiments do not require changes to existing communication protocols. It is therefore transparent to both existing applications and communication protocols.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It should again be emphasized that the particular authentication and communication techniques described above are provided by way of illustration, and should not be construed as limiting the present invention to any specific embodiment or group of embodiments. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for configuring a one-time authentication token, comprising the steps of:
providing a plurality of selectively enabled token features in said configurable one-time authentication token, wherein said plurality of selectively enabled token features comprise at least two of a split-server passcode verification feature, a silent alarms feature, a drifting keys feature, a forward-secure pseudorandom number generation feature, a token randomness generation feature used for the generation of passcodes, a randomized state transitions feature, a data-transaction signing feature, an auxiliary channel feature and a time synchronization feature used to maintain synchronization between said one-time authentication token and an authentication server;
obtaining a configuration selection of at least said plurality of said selectively enabled token features; and
configuring said one-time authentication token based on said configuration selection to enable said selected token features in said one-time authentication token, wherein said configuration selection must always enable said forward-secure pseudorandom number generation feature for said one-time authentication token and at least one additional selected token feature, wherein said time synchronization feature communicates that a forward clock attack has occurred.

2. The method of claim 1, further comprising the step of ensuring said configuration selection satisfies one or more dependency rules relating at least two of said selectively enabled token features.

3. The method of claim 2, wherein said one or more dependency rules comprise requiring that each of said split-server passcode verification feature and said silent alarms feature each require said forward-secure pseudorandom number generation feature.

4. The method of claim 2, wherein said one or more dependency rules comprise requiring said randomized state transitions feature requires a randomness source feature.

5. The method of claim 2, wherein said one or more dependency rules comprise requiring said drifting keys feature and said silent alarms feature require said auxiliary channel feature.

6. The method of claim 2, wherein said one or more dependency rules comprise requiring said drifting keys feature requires a randomness source feature.

7. The method of claim 1, wherein said split-server passcode verification feature, said silent alarms feature and said drifting keys feature comprise high-layer protection that provides intrusion-detection and intrusion-resilience.

8. The method of claim 7, wherein said high-layer protection provides resistance to cloning of said one-time authentication token.

9. The method of claim 1, wherein said forward-secure pseudorandom number generation feature, said token randomness generation feature and said randomized state transitions feature comprise low-layer protection that provides tamper-resistance.

10. The method of claim 9, wherein said low-layer protection provides leakage resistance by said one-time authentication token of a secret state of said one-time authentication token.

11. The method of claim 1, wherein said data-transaction signing feature, said auxiliary channel feature and said time synchronization feature comprise intermediate-layer protection that provides token-visibility.

12. The method of claim 11, wherein said intermediate-layer protection allows said one-time authentication token to communicate an assessment of said one-time authentication token to said authentication server.

13. The method of claim 1, wherein said one-time authentication token is selectively configured at one or more of a time of manufacture, system initialization and software update time.

14. A non-transitory machine-readable recordable storage medium for configuring a one-time authentication token, wherein one or more software programs when executed by one or more processing devices implement the steps of the method of claim 1.

15. The method of claim 1, wherein said drifting keys feature is enabled and wherein said method further comprises the step of using one or more drifting key bits to update a drifting-key state for said drifting keys feature.

16. An apparatus for configuring a one-time authentication token, the apparatus comprising:
a memory; and
at least one hardware device, coupled to the memory, configured to implement the following steps:
provide a plurality of selectively enabled token features in said configurable one-time authentication token, wherein said plurality of selectively enabled token features comprise at least two of split-server passcode verification feature, a silent alarms feature, a drifting keys feature, a forward-secure pseudorandom number generation feature, a token randomness generation feature used for the generation of passcodes, a randomized state transitions feature, a data-transaction signing feature, an auxiliary channel feature and a time synchronization feature used to maintain synchronization between said one-time authentication token and an authentication server,
obtain a configuration selection of at least said plurality of said selectively enabled token features; and
configure said one-time authentication token based on said configuration selection to enable said selected token features in said one-time authentication token, wherein said configuration selection must always enable said forward-secure pseudorandom number generation feature for said one-time authentication token and at least one additional selected token feature, wherein said time synchronization feature communicates that a forward clock attack has occurred.

17. A configurable one-time authentication token, comprising:
a plurality of selectively enabled token features in said configurable one-time authentication token, wherein said plurality of selectively enabled token features comprise at least two of split-server passcode verification feature, a silent alarms feature, a drifting keys feature, a forward-secure pseudorandom number generation feature, a token randomness generation feature used for the generation of passcodes, a randomized state transitions feature, a data-transaction signing feature, an auxiliary channel feature and a time synchronization feature that maintains synchronization between said one-time authentication token and an authentication server, wherein said configurable one-time authentication token is always configured to enable said forward-secure pseudorandom number generation feature for said one-time authentication token and at least one additional token feature, wherein said time synchronization feature communicates that a forward clock attack has occurred, and wherein said forward-secure pseudorandom number generation feature obtains a secret state from at least one memory using at least one processing device.

18. The configurable one-time authentication token of claim 17, wherein said configurable one-time authentication token computes a user authentication passcode based on a state corresponding to a current leaf node in a hierarchical tree.

19. The configurable one-time authentication token of claim 17, further comprising a plurality of protocode generation modules for generating a plurality of protocodes for use with a plurality of split authentication servers.

20. The configurable one-time authentication token of claim 19, wherein said plurality of protocode generation modules comprise a forward secure pseudo random number generator and a protocode generator.

21. The configurable one-time authentication token of claim 20, wherein said forward secure pseudo random number generators produce a forward-secure pseudorandom key K that is processed by said protocode generator based on a current time epoch T of said configurable one-time authentication token and optionally additional data input D to generate a corresponding protocode P.

22. The configurable one-time authentication token of claim 20, wherein only one of said forward secure pseudo random number generators produce forward secure pseudo random values processed by an auxiliary-information module of said configurable one-time authentication token.

23. The configurable one-time authentication token of claim 17, further comprising an auxiliary-information module.

24. The configurable one-time authentication token of claim 23, wherein said auxiliary-information module encodes one or more bits into a codeword to embed auxiliary information into a final passcode at time epoch T.

25. The configurable one-time authentication token of claim 23, wherein said auxiliary-information module sets a flag to indicate if auxiliary information is embedded in a final passcode at time epoch T.

26. The configurable one-time authentication token of claim 23, wherein said auxiliary-information module maps one or more bits from said silent alarm feature and said drifting keys feature into a codeword.

27. The configurable one-time authentication token of claim 26, wherein said silent alarm feature produces one or more silent alarm bits corresponding to a silent alarm state of said configurable one-time authentication token.

28. The configurable one-time authentication token of claim 26, wherein said drifting keys feature generates an updated set of keys $\kappa_t$ for time t by applying a randomized key update function to a previous set of keys $\kappa_{t-1}$ for time t−1.

29. The configurable one-time authentication token of claim 26, wherein said drifting keys feature shifts a drifting key state by k positions and inserts new random bits into the drifting key state.

30. The configurable one-time authentication token of claim 26, further comprising a passcode-generation module that combines outputs of one or more protocode generation modules with an output of an auxiliary-information module to produce a final one-time authentication passcode.

31. The configurable one-time authentication token of claim 26, wherein a random jitter delays or expedites a beginning of a computation of one or more operations with respect to a beginning of a current epoch T.

32. The configurable one-time authentication token of claim 26, wherein at least a first forward secure pseudo random number generator sequentially updates a state and computes a first pseudorandom key and values; and wherein if T is the beginning of an epoch $\tilde{T}$ that is larger than T, then said first pseudorandom keys and values are precomputed for some future epochs T.

33. The configurable one-time authentication token of claim 26, wherein at least two forward secure pseudo random number generators exchange hashes of partial states that lie at a higher level of a hierarchy.

34. The configurable one-time authentication token of claim 26, wherein a combined protocode for epoch T is computed, incorporating any additional transactional data input to the token for epoch T.

35. The configurable one-time authentication token of claim 26, wherein at epoch T, a silent-alarm state is sampled to a silent-alarm bit and a drifting-key state is sampled to drifting-key bits; wherein if T corresponds to the beginning of an epoch $\tilde{T}$, then the drifting-key state is updated and shifted prior to said sampling of drifting-key bits.

36. The configurable one-time authentication token of claim 26, wherein an auxiliary channel maps auxiliary-information bits to a codeword $W_T$, by which a combined protocode is shifted to obtain a final OTP passcode for epoch T.

37. The configurable one-time authentication token of claim 26, wherein if a current epoch T is a first epoch after a launching of a token application, then one or more forward secure pseudorandom number generators update their states in a step of an appropriate length.

\* \* \* \* \*

UNITED STATES PATENT AND TRADEMARK OFFICE
CERTIFICATE OF CORRECTION

PATENT NO. : 9,270,655 B1
APPLICATION NO. : 13/837259
DATED : February 23, 2016
INVENTOR(S) : Ari Juels et al.

It is certified that error appears in the above-identified patent and that said Letters Patent is hereby corrected as shown below:

In the Specification

Column 1, Line 17, replace "Passcodes;"" with --Passcodes," (now U.S. Patent No. 9,225,717);--.

Column 11, Line 11, replace "Tokens." certain portions" with --Tokens," certain portions--.

Column 11, Line 36, replace "Passcodes," it is possible" with --Passcodes," (now U.S. Patent No. 9,225,717), it is possible--.

Column 20, Lines 7 and 9, replace "$B_{T*}^{*}$" with -- $\mathcal{B}_{T^*}^*$ --.

Signed and Sealed this
Fourteenth Day of February, 2017

Michelle K. Lee
*Director of the United States Patent and Trademark Office*